United States Patent
Foottit et al.

(10) Patent No.: US 8,320,246 B2
(45) Date of Patent: Nov. 27, 2012

(54) ADAPTIVE WINDOW SIZE FOR NETWORK FAIR USAGE CONTROLS

(75) Inventors: Tom Foottit, Stittsville (CA); Yong Li, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 175 days.

(21) Appl. No.: 12/708,299

(22) Filed: Feb. 18, 2010

(65) Prior Publication Data

US 2011/0044353 A1 Feb. 24, 2011

Related U.S. Application Data

(60) Provisional application No. 61/153,910, filed on Feb. 19, 2009.

(51) Int. Cl.
*H04L 1/00* (2006.01)
(52) U.S. Cl. ........ 370/230; 370/252; 370/329; 370/338; 370/468; 455/452.1; 709/225; 709/226
(58) Field of Classification Search .......... 370/229–235, 370/252, 253, 328–338, 468; 455/450–453; 709/223–226
See application file for complete search history.

(56) References Cited

U.S. PATENT DOCUMENTS

| | | | |
|---|---|---|---|
| 5,713,013 A | 1/1998 | Black | |
| 6,343,085 B1 | 1/2002 | Krishnan et al. | |
| 6,577,717 B1 | 6/2003 | Henon | |
| 6,597,903 B1 | 7/2003 | Dahm et al. | |
| 6,832,248 B1 | 12/2004 | Byrnes | |
| 6,941,134 B2 | 9/2005 | White | |
| 6,999,449 B2 | 2/2006 | Barna et al. | |
| 7,047,312 B1 | 5/2006 | Aweya et al. | |
| 7,113,990 B2 | 9/2006 | Scifres et al. | |
| 7,130,541 B2 | 10/2006 | Farmer et al. | |
| 7,280,818 B2 | 10/2007 | Clayton | |
| 7,417,992 B2 | 8/2008 | Krishnan | |
| 7,434,011 B2 | 10/2008 | Shue | |
| 7,493,081 B2 | 2/2009 | Burdick et al. | |
| 7,493,650 B2 | 2/2009 | Peled et al. | |
| 7,536,455 B2 | 5/2009 | Duffield et al. | |
| 8,055,237 B2 | 11/2011 | Jones et al. | |
| 8,280,346 B2 | 10/2012 | Jones et al. | |
| 2004/0047324 A1 | 3/2004 | Diener | |

(Continued)

FOREIGN PATENT DOCUMENTS

JP 2001028777 A 1/2001

(Continued)

OTHER PUBLICATIONS

International Search Report and Written Opinion for PCT/IB2010/000470, dated Jul. 29, 2010, 6 pages.

(Continued)

*Primary Examiner* — Pao Sinkantarakorn
(74) *Attorney, Agent, or Firm* — Zilka-Kotab, PC

(57) ABSTRACT

Systems and methods for providing adaptive fine-grained fair usage controls are provided. Rather than providing a fixed fair usage threshold having time and data volume for all subscribers in the network, a quota manager at the policy controller defines an initial fair usage window having a longer period of time and higher data volume. When a subscriber exceeds the initial window, the quota manager provides a smaller time period and lower data volume. The quota manager continues to adapt the fair usage window in this way until a violation of the fair usage threshold is detected. The adaptive fair usage windows may be based on subscriber profile information, subscriber session information, and/or prior subscriber usage history.

19 Claims, 4 Drawing Sheets

U.S. PATENT DOCUMENTS

| | | | |
|---|---|---|---|
| 2004/0156489 | A1 | 8/2004 | Vishik et al. |
| 2005/0152300 | A1 | 7/2005 | Edsberg |
| 2006/0090076 | A1 | 4/2006 | De Cnodder et al. |
| 2006/0276180 | A1 | 12/2006 | Henry, Jr. |
| 2007/0177626 | A1 | 8/2007 | Kotelba |
| 2008/0096524 | A1 | 4/2008 | True et al. |
| 2008/0256537 | A1 | 10/2008 | Fachan et al. |
| 2009/0068984 | A1 | 3/2009 | Burnett |
| 2009/0197597 | A1 | 8/2009 | Kotecha |
| 2009/0203352 | A1 | 8/2009 | Fordon et al. |
| 2010/0022216 | A1 | 1/2010 | Bandera et al. |
| 2010/0035576 | A1 | 2/2010 | Jones et al. |
| 2010/0217855 | A1* | 8/2010 | Przybysz et al. ............. 709/223 |
| 2011/0151831 | A1 | 6/2011 | Pattabiraman |
| 2011/0264726 | A1* | 10/2011 | Zabawskyj et al. ........... 709/203 |
| 2011/0275344 | A1 | 11/2011 | Momtahan et al. |
| 2011/0276442 | A1 | 11/2011 | Momtahan et al. |
| 2012/0030017 | A1 | 2/2012 | Jones et al. |

FOREIGN PATENT DOCUMENTS

| | | |
|---|---|---|
| WO | 9965184 A2 | 12/1999 |
| WO | WO 0125877 A2 | 4/2001 |

OTHER PUBLICATIONS

Notice of Allowance from U.S. Appl. No. 12/186,831, dated Sep. 19, 2011.

Notice of Allowance from U.S. Appl. No. 13/267,824, dated Apr. 16, 2012.

Non-Final Office Action from U.S. Appl. No. 13/267,824, dated Nov. 28, 2011.

Non-Final Office Action from U.S. Appl. No. 12/773,550, dated Feb. 3, 2012.

International Search Report and Written Opinion from International Application No. PCT/IB2009/005370, dated Jul. 2, 2010.

Massoulie, L. et al., "Bandwidth sharing: objectives and algorithms", IEEE, 1999, pp. 1395-1403.

Anjum, F. et al., "Fair Bandwidth Sharing among Adaptive and Non-Adaptive Flows in the Internet", IEEE, 1999, pp. 1412-1420.

Final Office Action from U.S. Appl. No. 12/773,550, dated Aug. 31, 2012.

* cited by examiner

ADAPTIVE WINDOW SIZE FOR NETWORK FAIR USAGE CONTROLS

CROSS REFERENCE TO RELATED APPLICATIONS

The present application claims priority to U.S. Provisional Patent Application No. 61/153,910, entitled Adaptive Window Size for Network Fair Usage Controls, filed on Feb. 19, 2009 by Foottit et. al., which is hereby expressly incorporated by reference in its entirety.

The present application is also related to commonly owned, co-pending U.S. patent application Ser. No. 12/389,818, entitled, System and Method for Adaptive Fair Usage Controls in Wireless Networks, filed on Feb. 20, 2009 by Edwin Gans, which is hereby expressly incorporated by reference in its entirety.

FIELD OF THE INVENTION

The present invention relates generally to communications networks and specifically to fair usage control within a communications network.

BACKGROUND

An increasingly large number of individuals use portable computing devices, such as laptop computers, personal data assistants (PDAs), smart phones and the like, to support mobile communications. The number of computing devices, and the volume of data communicated, has increased dramatically in recent years. Market studies have concluded that this trend of ever-increasing demands for data communication coupled with subscribers seeking expanded mobility will continue.

As telecommunications technology continues to evolve to meet this ever increasing demand, service providers continue to make investments in state-of-the-art technology in order to remain at the forefront of offerings in the marketplace. However, in order to maximize the experience of their subscriber base, service providers are constantly challenged to ensure trouble-free support for the modern wireless data communications protocols, while limiting subscribers who consume excessive bandwidth at the expense of other subscribers.

In third generation data communications networks, subscribers are typically provided with a high bandwidth limit for technical reasons. Specifically, the high bandwidth limit ensures that the bursty nature of the current generation of data communication protocols is fully supported. The engineering assumption made by wireless service providers is that each individual subscriber in the customer base infrequently reaches this high limit. However, some subscribers are exploiting this high bandwidth setting and are continuously using the service at the high bandwidth limit. These subscribers are considered to be abusing the communications system. Since there is an overall bandwidth limit in any given geographical coverage area, continuous usage at an excessive level by certain subscribers reduces the available bandwidth for the rest of the subscriber base. The net result is a diminished experience for the vast majority of subscribers. Although the number of subscribers who are guilty of excessive usage is currently few, their numbers are expected to grow significantly in the near term, and pose a significant challenge to communications network providers.

Prior solutions for network fair usage control defined a period of time and a data volume that can be used over that period. For example, fair usage might be defined as consuming less than 10 MB over a one hour period. Any subscriber exceeding this volume in that time period would be deemed excessive. A service provider wants the time period to be as short as possible to detect the excessive or "unfair" usage. However, making the time window shorter places a higher and higher processing cost on the control system and also the policy enforcement point in the network. Because typically a small percentage of subscribers would have an excessive usage, shortening the time window means very high processing costs that are not relevant to the vast majority of subscribers.

What is therefore needed are systems and methods for providing adaptive fine-grained fair usage controls without excessive load on the control system or policy enforcement point. Co-Pending, commonly owned U.S. patent application Ser. No. 12/389,818, entitled, System and Method for Adaptive Fair Usage Controls in Wireless Networks, file Feb. 20, 2009 describes an approach to providing fair usage controls without excessive load. U.S. patent application Ser. No. 12/389,818 is incorporated herein in its entirety. The present application provides additional adaptive fair usage controls and approaches to reduce load on control systems and policy enforcement points.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
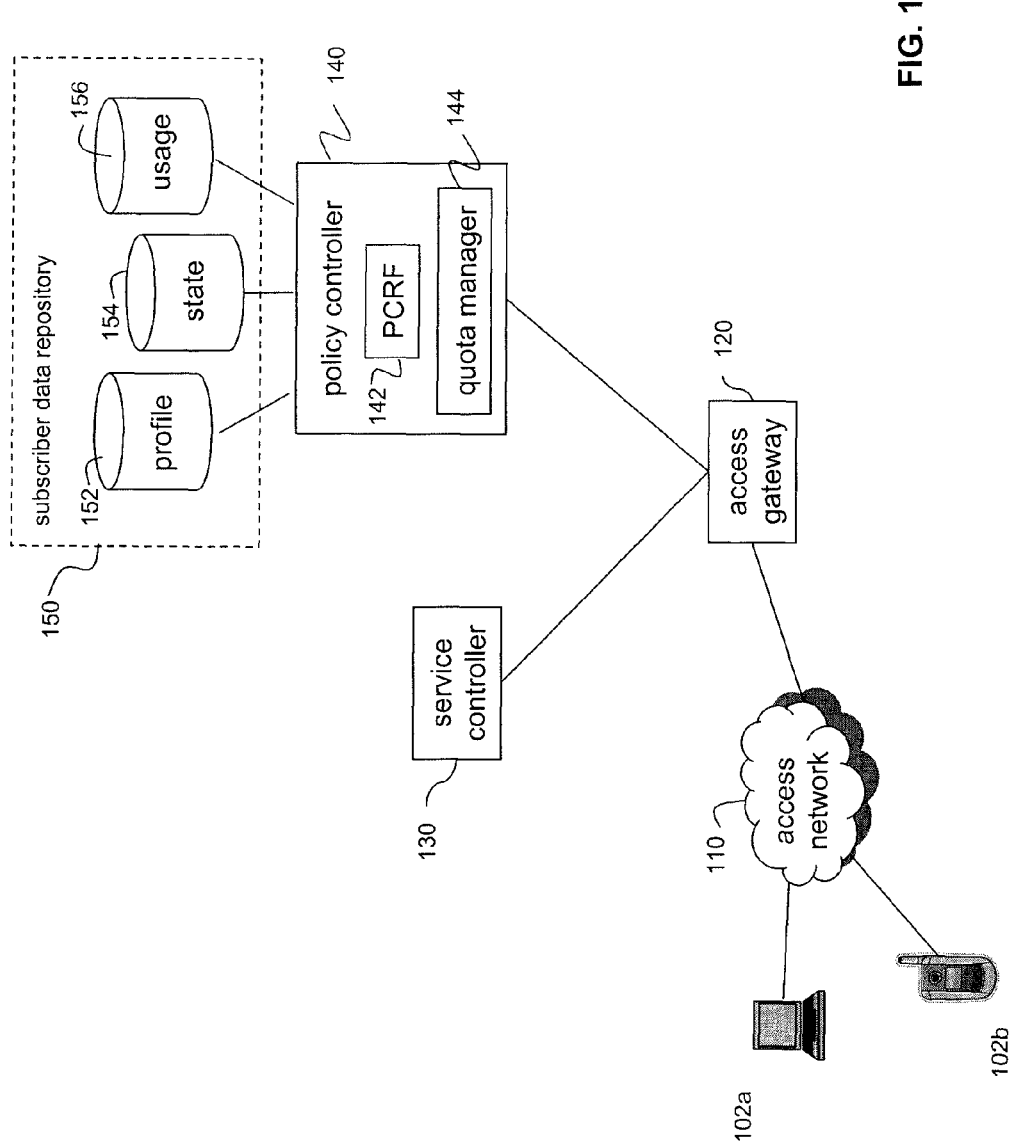
FIG. 1 depicts an exemplary operating environment for providing an adaptive window size for network fair usage controls within a communications network, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 provides an exemplary operating environment 100 for providing an adaptive window size for network fair usage controls, according to embodiments of the present invention. Operating environment 100 includes user equipment 102, access network 120, access gateway 120, optional service controller 130, policy controller 140, and subscriber data repository 150. Operating environment 100 provides a simplified diagram of a communications network to illustrate the concepts of fair usage controls. As would be recognized by persons of skill in the art, embodiments of the present invention can be used in any type of communications network (e.g., wireline, wireless, or hybrid networks).

User equipment 102 is any device that provides a user access to one or more networks. User equipment 102 can include, but is not limited to, a computer such as user equipment 102a, a wireless phone such as user equipment 102b, a smart phone, a personal digital assistant (PDA), other wireless mobile devices, and/or wired communications devices.

Access network 110 is a communications network that couples user equipment 102 to a packet data network (not shown). Access network 110 may be a third generation partnership project (3GPP) access network or a non-3GPP access network. Exemplary 3GPP access networks include the UMTS terrestrial radio access network (UTRAN) and the GSM EDGE radio access network (RAN). Other access networks include, but are not limited to, WiFi, WiMAX, CDMA2000, GSM, and UMTS.

Access gateway 120 provides an interface between access network 110 and a packet data network (not shown). In a 3GPP network, access gateway 120 may be the Gateway GPRS Support Node (GGSN). Note that access gateway 120 may also act as a policy enforcement point.

Policy controller 140, at a high level, includes subscriber profiles and network policies needed to manage network resources, such as bandwidth, according to a subscriber, session, and/or application. A service provider may apply a policy based on business rules associated with a variety of factors (e.g., service tiers and/or dynamic parameters such as time of day).

Policy controller 140 includes a policy and charging rules function (PCRF) 142 and a quota manager 144. In a 3GPP network, PCRF 142 acts as a decision point for policy and charging control of service data flows. PCRF 142 is configured to select and provide the applicable policy and charging control decisions to the policy control enforcement point.

Quota manager 144 is configured to provide fine-grained adaptive fair usage controls. Rather than defining a fixed time and volume for all subscribers, quota manager 144 defines an initial window that may be a longer period of time. When a subscriber exceeds the initial window, quota manager 144 provides a smaller window. If the subscriber exceeds the smaller window, quota manager 144 provides a still smaller window and so on until the subscriber violates a window small enough to be considered in breach of fair usage.

Quota manager 144 is configured to set these adaptive fair usage windows according to a variety of techniques including, but not limited to, using pre-defined value or values, calculating windows based on one or more formulas, and/or determining window based on how quickly previous windows were violated. Methods for determining adaptive fair usage windows are described in further detail in the discussion of FIGS. 2 and 3.

Policy controller 140 is coupled to subscriber data repository 150.

Subscriber data repository 150 includes a subscriber profile database 152, a subscriber state database 154, and a subscriber usage database 156. Although depicted as three separate databases in FIG. 1, a person of ordinary skill in the art will recognize that subscriber profile, subscriber state, and subscriber usage data may be stored in any number of databases.

Policy controller 140 is further coupled to access gateway 120. In an embodiment, the interface between policy controller 140 and access gateway 120 is a Gy interface.

Subscriber state database 154 includes information that identifies and defines a subscriber's network session. Subscriber state information includes the subscriber identifier for the session (e.g., MSISND, MIN, Private ID, etc), information about the network such as the IP address the subscriber is currently using and what network or networks to which the subscriber is currently connected, device information such as the device being used and the version of the software, location and roaming information, and other unique state information.

In an embodiment of the present invention, unique state information includes the current fair usage window assigned to the subscriber session.

When a subscriber connects to any network, the core elements of the network assign an IP address to the subscriber. At that time, the subscriber session begins and subscriber state information is created, derived and captured. For example, state information is typically generated either through RADIUS accounting or through interactions with the dynamic host control protocol (DHCP) service on a network. The accounting message feeds are generated to a RADIUS engine or a AAA service from core network elements.

Subscriber profile database 152 includes static information about the subscriber. This information may include the service tier (e.g., gold, silver, bronze) assigned to the subscriber.

Subscriber usage database 156 includes static and dynamic information related to the subscriber's history. In embodiments of the present invention, subscriber usage database 156 may store information about the fair usage window assigned to the subscriber in previous sessions. The quota manager uses the fair usage window from prior sessions to adapt the current fair usage window based on previous behavior patterns.

Figure 2:
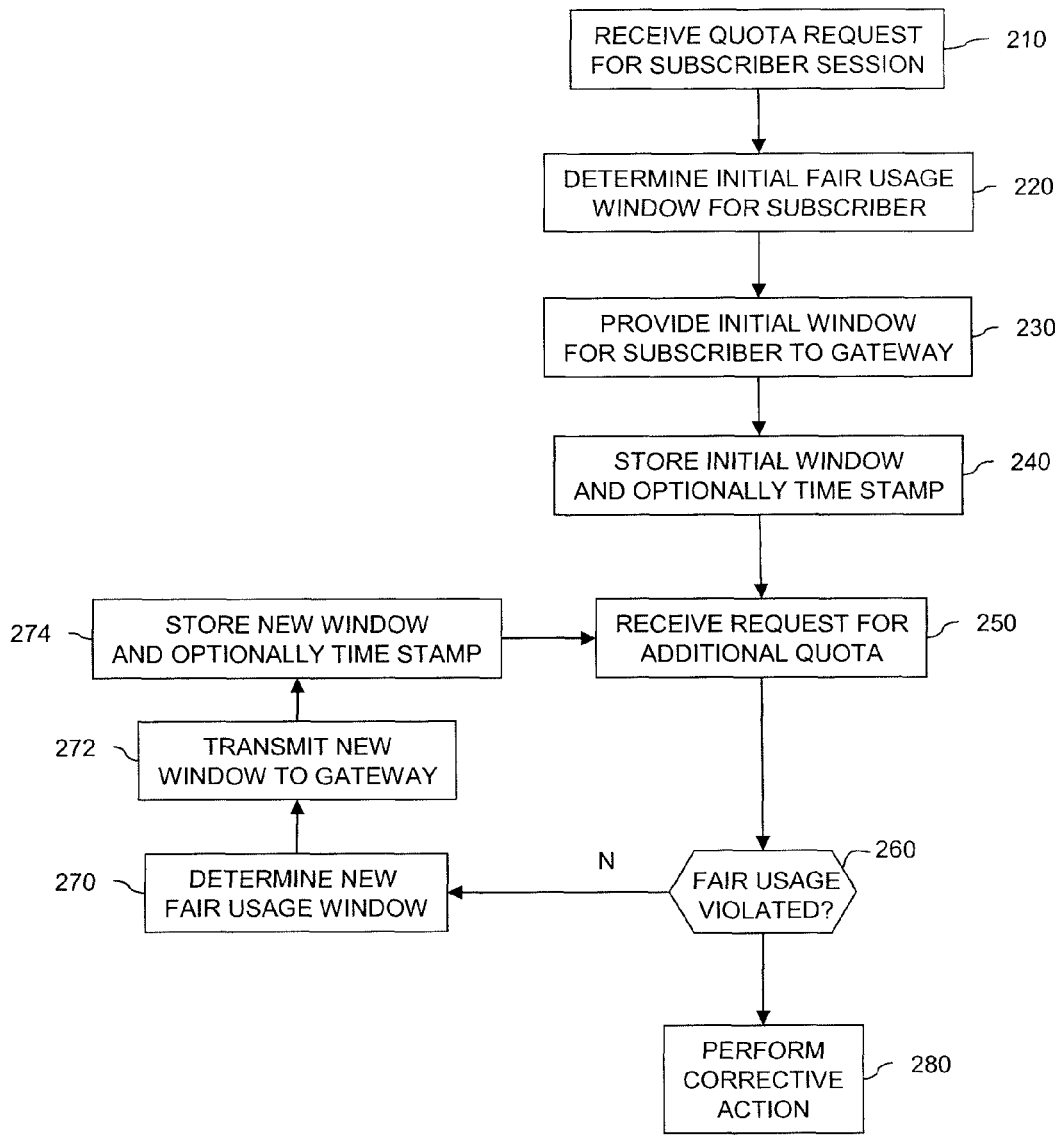
FIG. 2 depicts a flowchart of an exemplary method for providing an adaptive window size for network fair usage controls, according to embodiments of the present invention.

FIG. 2 depicts a flowchart 200 of an exemplary method for providing an adaptive window size for network fair usage controls, according to embodiments of the present invention. FIG. 2 is described with continued reference to the operating environment of FIG. 1. However, flowchart 200 is not limited to that embodiment.

In step 210, policy controller 140 receives an initial usage quota request for a subscriber session. The quota request may include a request for service volume and usage time. In an embodiment, the usage quota request is received in a credit control request (CCR) message.

In step 220, quota manager 144 determines the initial fair usage window for the subscriber. In this step, policy controller 140 may retrieve subscriber information from subscriber data repository 150 to make the initial determination.

In an embodiment, the initial fair usage window may be based on subscriber profile information. In this embodiment, policy controller 140 retrieves subscriber profile information such as the subscriber's service tier from the subscriber profile database. For example, policy controller 140 may have a ladder of fair usage windows pre-defined for each service tier. For example, a gold tier subscriber may have an initial fair usage window set as 20 MB over 12 hours, the second fair usage window set as 10 MB over 6 hours, and a final fair usage window set as 2 MB over 1 hour. A service provider may opt to give a lower tier subscriber less flexibility when determining the adaptive fair usage window.

In an additional or alternative embodiment, the initial fair usage window is set based on the subscriber's prior usage history. In this embodiment, the policy controller retrieves subscriber session state information and/or usage information from the subscriber data repository 150. The policy manager may set the initial fair usage window based on the subscriber's prior usage characteristics. For example, the last fair usage (quota) window assigned to the subscriber in their prior session may be used as the initial fair usage window for the current session. This usage of prior session information allows the system to determine who the high bandwidth subscribers are based on their previous behavior and to put more aggressive controls in place for those subscribers.

The quota manager may further set the initial fair usage window based on a formula using subscriber profile information, session state information, and/or usage information as inputs.

In step 230, the initial fair usage window (initial quota) is returned to the requesting gateway or gateway support node. For example, the policy controller may return a credit control answer (CCA) message to the requesting network entity. The CCA message contains the initial fair usage window (initial quota) in terms of time and volume (e.g., 20 MB over 12 hours).

In step 240, the initial fair usage window provided to the subscriber is stored. In an embodiment, the initial fair usage window is stored in the subscriber session state database. However, the initial fair usage window may be stored in another subscriber data repository or stored locally at the quota manager. Additionally, the quota manager may store a timestamp associated with when the initial fair usage window (quota) was provided for the subscriber.

In step 250, the quota manager receives a subsequent request for additional quota. This situation occurs when the subscriber exceeds the volume allocated in a shorter period of time then allowed. For example, if the initial fair usage window was set at a volume of 20 MB in 12 hours and the subscriber used 20 MB in less than 12 hours, the serving gateway or serving gateway support node requests additional volume from the policy controller. This request for additional quota may be transmitted in a CCR message.

In step 260, a determination whether the subscriber has violated the fair usage threshold is made. In this step, the quota manager must retrieve or determine the fair usage threshold for the subscriber. In an embodiment, the quota manager may have a pre-defined fair usage threshold applicable to all subscribers. In an alternate embodiment, the quota manager may have pre-defined fair usage thresholds based on subscriber profile data (e.g., service tier). In further embodiments, the quota manager may determine the subscriber fair usage threshold based on one or more formulas.

If the fair usage threshold has been exceeded, operation proceeds to step 280. If the fair usage threshold has not been exceeded, operation proceeds to step 270.

In step 270, the quota manager determines a new fair usage window for the subscriber. The new fair usage window may be pre-defined, calculated by the system based on a formula, or based on how quickly the previous fair usage window was violated.

In an embodiment, the subsequent fair usage window may also be based on subscriber profile information. In this embodiment, the policy controller retrieves subscriber profile information such as the subscriber's service tier from the subscriber profile database. For example, the policy manager may have a ladder of fair usage windows pre-defined for each service tier. The quota manager then selects the next fair usage window from the fair usage window ladder for the subscriber.

In an additional or alternative embodiment, the subsequent fair usage window is set based on the subscriber's prior usage history. In this embodiment, the policy controller retrieves subscriber session state information and/or usage information from the subscriber data repository 150. For example, the quota manager may access the timestamp associated with the prior provided fair usage window. The subsequent fair usage window may then be based on how rapidly the subscriber violated the prior fair usage window.

In step 272, the subsequent fair usage window (subsequent quota) is returned to the requesting gateway or gateway support node. For example, the policy controller may return a credit control answer (CCA) message to the requesting network entity. The CCA message contains the subsequent fair usage window in terms of time and volume.

In step 274, the subsequent fair usage window provided to the subscriber is stored. In an embodiment, the subsequent fair usage window is stored in the subscriber session state database. However, the subsequent fair usage window may be stored in another subscriber data repository or stored locally at the quota manager. Additionally, the quota manager may store a timestamp associated with when the subsequent fair usage window (quota) was provided for the subscriber.

Operation then returns to step 260 to wait for a subsequent request for additional quota. In this way, the fair usage window is continually adapted for the subscriber throughout the session.

In step 280, after the fair usage threshold is violated, policy controller determines the appropriate action to take. In an embodiment, the policy controller applies one or more business rules to make the determination of the appropriate action. The business rules may use subscriber data such as profile, session, and/or usage data when making the determination. Exemplary actions include modifying the subscriber's Quality of Service (QoS) and/or charging characteristics to prevent them from using too much bandwidth or to charge the subscriber for using the excess bandwidth.

Figure 3:
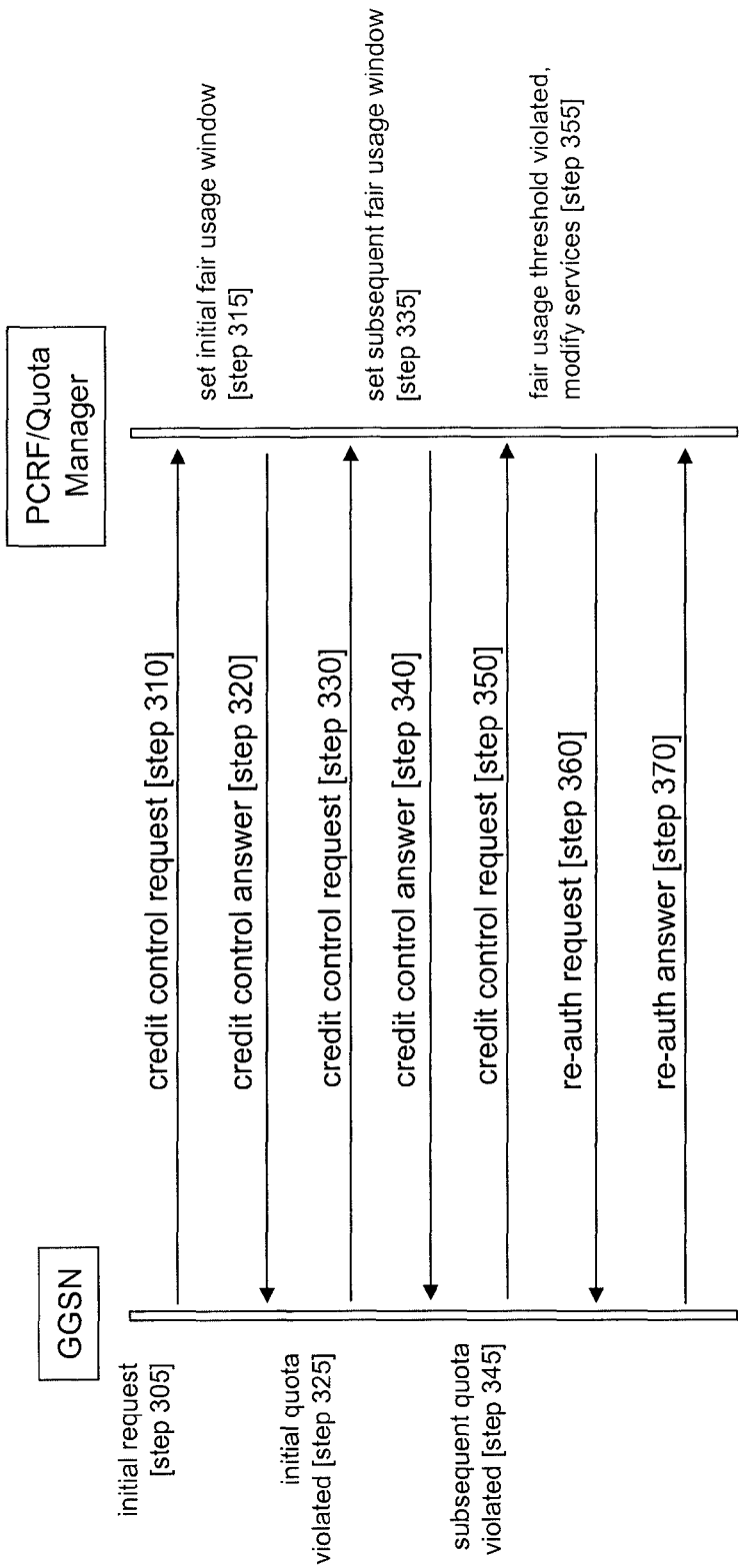
FIG. 3 depicts an exemplary message flow diagram for providing adaptive window size for network fair usage controls in Third Generation Partnership Project (3GPP) network, according to embodiments of the present invention.

FIG. 3 depicts an exemplary message flow diagram 300 for providing adaptive window size for network fair usage controls in Third Generation Partnership Project (3GPP) network, according to embodiments of the present invention.

In step 305, the gateway GPRS support node (GGSN) makes an initial request for a usage quota.

In step 310, the GGSN transmits the quota request in a credit control request (CCR) message to the PCRF/quota manager.

In step 315, the PCRF/quota manager sets the initial fair usage window to an initial value (e.g., 20 MB over 12 hours).

In step 320, the PCRF/quota manager provides a volume that can be consumed and a maximum time during which the volume may be consumed in a credit control answer (CCA) message.

In step 325, the GGSN determines that the initial quota has been violated by the subscriber. That is, the GGSN runs out of volume before the time period has expired.

In step 330, the GGSN makes a request to the PCRF/Quota Manager for additional quota.

In step 335, the PCRF/quota manager determines the subsequent fair usage window for the subscriber (e.g., 10 MB over 6 hours).

In step 340, the PCRF/quota manager returns the new volume quota and the new maximum time during which the volume can be consumed to the GGSN.
The new time is shorter than the previous time so that the fair usage breach can be detected on a more fine-grained level.

In step 345, the GGSN determines that the subsequent fair usage window for the subscriber has been violated.

In step 350, the GGSN makes a request to the PCRF/quota manager for additional quota.

In step 355, the PCRF/quota manager determines that the fair usage threshold has been exceeded by the subscriber and determines that the user's services should be modified (e.g., changing QoS and/or charging characteristics).

In step 360, the service modifications are transmitted to the GGSN in the re-auth request (RAR) message.

In step 365, the GGSN makes the indicated service modifications.

In step 370, the GGSN confirms the service modifications to the PCRF/quota manager via the re-auth answer (RAA) message.

Exemplary Computer System Implementation

Figure 4:
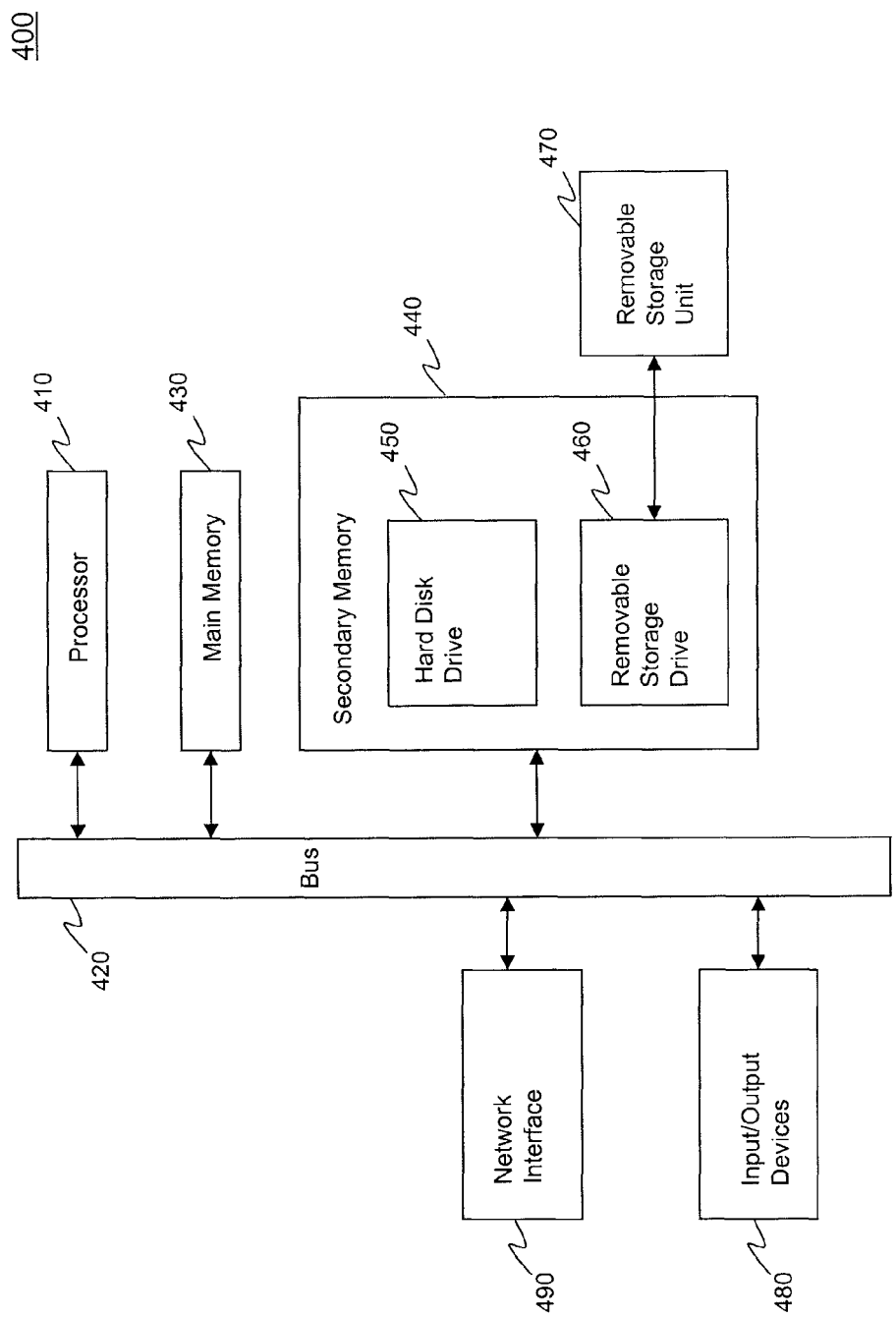
FIG. 4 depicts an exemplary computer system on which methods and systems herein may be implemented, according to embodiments of the present invention.

In an embodiment of the present invention, the methods and systems of the present invention described herein are implemented using well known computers, such as a computer 400 shown in FIG. 4. The computer 400 can be any commercially available and well known computer capable of performing the functions described herein, such as computers available from International Business Machines, Apple, Sun, HP, Dell, Cray, etc.

Computer 400 includes one or more processors (also called central processing units, or CPUs), such as processor 410. Processor 400 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 1070.

As will be appreciated, removable storage unit 460 includes a computer usable or readable storage medium having stored therein computer software (control logic) and/or data. Removable storage drive 460 reads from and/or writes to the removable storage unit 470 in a well known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490.

Embodiments of the present invention can work with software, hardware, and operating system implementations other than those described herein. Any software, hardware, and operating system implementations suitable for performing the functions described herein can be used Conclusion While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:

receiving, at a policy controller, an initial request for a usage quota for a subscriber session;

providing an initial fair usage window for the subscriber session, wherein the initial fair usage window includes a data volume and a period of time during which the data volume may be used;

receiving, at the policy controller, a subsequent request for a new usage quota for the subscriber session when the subscriber exceeds the initial usage quota for the subscriber session;

determining, at a quota manager in the policy controller, a subsequent fair usage window for the subscriber session after the initial usage quota is exceeded, wherein the data volume and period of time in the subsequent fair usage window is shortened in response to the exceeding of the initial usage quota; and returning the subsequent fair usage window;

wherein determining the subsequent fair usage window comprises:

retrieving subscriber usage data from a subscriber data repository, wherein the subscriber usage data includes a final fair usage window assigned to the subscriber in a previous session, and determining the subsequent fair usage window based on the final fair usage window.

2. The method of claim 1, wherein determining the subsequent fair usage window further comprises:

retrieving subscriber profile data from a subscriber data repository; and determining the subsequent fair usage window based on a service tier associated with the subscriber.

3. The method of claim 1, further comprising: storing the initial fair usage window in a subscriber data repository.

4. The method of claim 3, further comprising:

storing a time stamp with the initial fair usage window in the subscriber data repository, wherein the time stamp indicates a time when the initial fair usage window was provided to network.

5. The method of claim 4, wherein determining the subsequent fair usage window further comprises:

determining the subsequent fair usage window based on how rapidly the initial fair usage window was exceeded.

6. The method of claim 1, wherein determining the subsequent fair usage window further comprises:

determining the subsequent fair usage window based on a formula.

7. The method of claim 1, further comprising:

receiving, at the policy controller, a further request for a new usage quota for the subscriber session when the subscriber exceeds the subsequent usage quota for the subscriber session; and determining, at the quota manager, whether a fair usage threshold associated with the subscriber session has been violated.

8. The method of claim 7, further comprising:
if it is determined that the fair usage threshold associated with the subscriber session has been violated, determining, in a policy and charging rules function, a modification to a service parameter for the subscriber; and
transmitting the service modification to a policy enforcement point in the network.

9. The method of claim 7, further comprising modifying a Quality of Service (QoS) associated with the subscriber when it is determined that the fair usage threshold has been violated.

10. The method of claim 1, further comprising retrieving prior session information from the subscriber data repository, and determining whether the subscriber is a high bandwidth subscriber, based on the prior session information.

11. A system, comprising:
a policy controller having at least one processor for:
receiving an initial request for a usage quota for a subscriber session;
providing an initial fair usage window for the subscriber session, wherein the initial fair usage window includes a data volume and a period of time during which the data volume may be used; and
receiving a subsequent request for a new usage quota for the subscriber session when the subscriber exceeds the initial usage quota for the subscriber session;
determining a subsequent fair usage window for the subscriber session after the initial usage quota is exceeded, wherein the data volume and period of time in the subsequent fair usage window is shortened in response to the exceeding of the initial usage quota; and
returning the subsequent fair usage window;
wherein determining the subsequent fair usage window comprises:
retrieving subscriber usage data from a subscriber data repository, wherein the subscriber usage data includes a final fair usage window assigned to the subscriber in a previous session, and
determining the subsequent fair usage window based on the final fair usage window.

12. The system of claim 11, further comprising:
the subscriber data repository for storing information associated with the subscriber associated with the subscriber session.

13. The system of claim 12, wherein the subscriber data repository includes:
a subscriber profile database for storing subscriber service level;
a subscriber session state database for storing information associated with the subscriber session; and
a subscriber usage database for storing information about prior network usage by the subscriber.

14. The system of claim 11, wherein the exceeding of the initial usage quota includes a violation of the fair usage window during the subscriber session.

15. The system of claim 14, wherein the subsequent fair usage window is further determined based on a service tier associated with the subscriber.

16. The system of claim 14, wherein the subsequent fair usage window is further determined based on how rapidly the fair usage window was violated by the subscriber.

17. The system of claim 14, wherein the subsequent fair usage window is further determined based on a formula.

18. A method, comprising:
providing, by a quota manager, an initial fair usage window for a subscriber session;
receiving requests, at the quota manager, for additional usage quotas when the provided fair usage window is exceeded during the subscriber session;
adapting, by the quota manager, a fair usage window provided in response to each request, wherein the fair usage window is shortened when the previous provided fair usage window is exceeded; and
providing the adapted fair usage window for the subscriber session;
wherein determining the adapted fair usage window comprises:
retrieving subscriber usage data from a subscriber data repository, wherein the subscriber usage data includes a final fair usage window assigned to a subscriber in a previous session, and
determining the adapted fair usage window based on the final fair usage window.

19. The method of claim 18, further comprising:
determining, at the quota manager, whether a fair usage threshold associated with a subscriber session has been violated;
determining, by a policy and charging rules function, a modification to a service parameter of the subscriber; and
providing the service parameter modification to a policy enforcement point in the network.

* * * * *